United States Patent Office 3,543,303
Patented Nov. 24, 1970

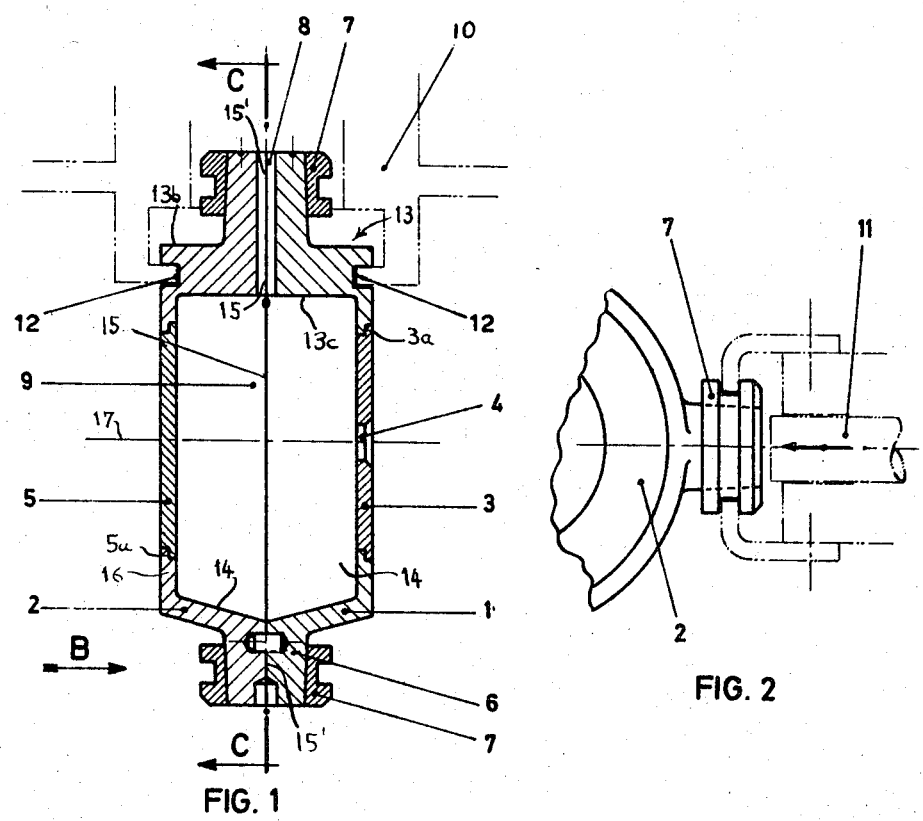
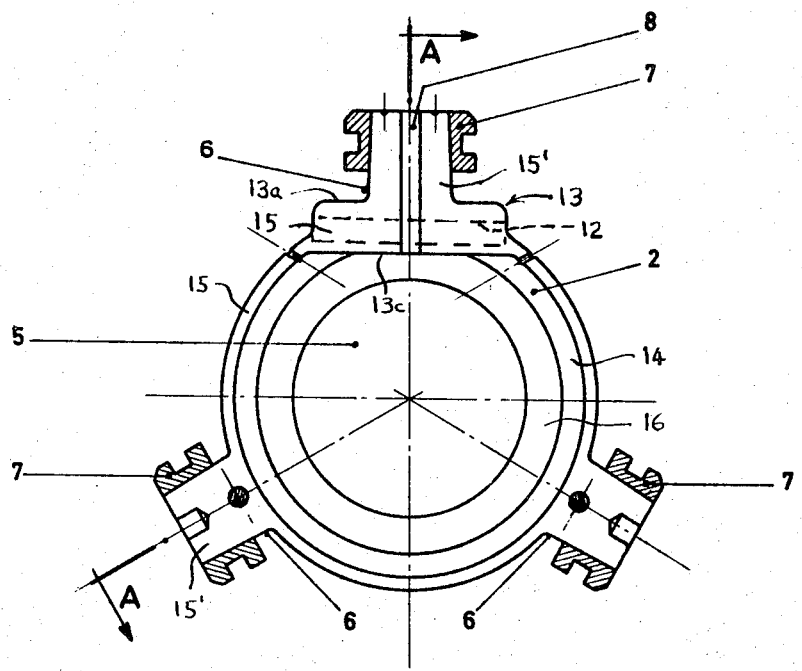

3,543,303
MOLD FOR DENTISTS
Fausto Sacchiero, Via Faustina 40,
Ponteranica, Bergamo, Italy
Filed Sept. 11, 1968, Ser. No. 759,012
Claims priority, application Italy, Nov. 25, 1967,
818,194
Int. Cl. B41b *11/60*
U.S. Cl. 249—164
11 Claims

ABSTRACT OF THE DISCLOSURE

An improved dental mold provided with a plurality of frustoconical extension halves on the cooperating mold halves, and closing rings for positioning about the frustoconical extension halves of both mold halves for closing and opening the mold. One of the frustoconical extension halves is formed with an injection duct centrally extending therethrough into communication with the hollow chamber between the mold halves and the outside of the mold constituting a passageway for the injection of plastic material into the mold chamber.

---

The present invention relates to an improved mold for dentists, rendering it perfectly efficient to perform all of the various operations to which it must be subjected and to simplify and accelerate the various operations in order to obtain a technically improved increased production.

It is one object of the present invention to provide improvements in the system of closing and opening the mold; the shape of the mold able to be operated thereon with the exact graduation of the internal plastic material forming the cast; the system of connection to the press injecting device for the plastic material; and the mechanical opening system operated by means of an extractor.

It is another object of the present invention to provide an improved dental mold comprising two mold halves each having a plurality of cooperating frustoconical extension halves, and closing rings adapted to be positioned about the frustoconical extension halves, one of the frustoconical extension halves being formed in its center with an injection duct communicating the outside of the mold with the mold chamber for injection of plastic material into the chamber.

It is another object of the present invention to provide a dental mold wherein the inner hollow chamber is substantially circular but formed square over a limited portion thereof to prevent displacement due to rotation of the cast and for simultaneously strengthening the chamber.

It is yet another object of the present invention to provide a mold in accordance with the above mentioned objectives wherein recesses are formed U-shaped about the mold halves corresponding to the strengthening zone and about the injection duct for connection of the mold with an injection press for the plastic material.

It is yet still another object of the present invention to provide a mold having two halves and closure discs located on the opposing walls of the mold, one of which is removable from the inside and the other removable from the outside for being replaced in position from the outside for effecting the final closing of the mold by exerting on the disc a slight manual pressure to cause any excess pasty plastic material to flow out an aperture.

It is still yet another object of the present invention to provide a mold in accordance with the above mentioned objectives wherein the closing ring is formed with external circular recesses for engagement of connecting members of a mechanical extractor which holds the ring at the recesses and presses on the frustoconical extension halves to effect the removal of the closing ring and the disengagement of the parts.

With the above and other objects in view, which will become apparent in the following detailed description, the present invention will be clearly understood in connection with the accompanying drawing, in which:

FIG. 1 is a section of the complete closed mold taken along the lines A—A of FIG. 3;

FIG. 2 is a fragmentary elevation of the mold seen in the direction of the arrow B of FIG. 1, and specifically the portion adjacent to one of the closing members located in contact with the extractor which actuates the devices for opening the mold, namely the removal of the locking rings; and FIG. 3 is a sectional view of one half of the mold, taken along the lines C—C of FIG. 1.

Referring now to the drawing, the mold is formed of two mold halves 1 and 2 which, when closed on each other, form an inner chamber 9 which defines a mold cavity for receiving a cast. The cast is formed, first, by operating with the mold completely open, that is, separated into two halves spaced apart from each other, and then closing the two mold halves together in a united and tightly sealed position by a ring 7 applied about frustoconical extension halves 6 of the mold halves 1 and 2. The opening resulting from the absence of a closure disc 3 is finally covered by placing the latter in position in the mold half 1. The closure disc 3 is lightly pressed by hand so that the excess plastic material, which is still in a pasty condition, may flow out through an aperture 4.

The mold half 2 is formed with a circular opening in which a closure disc 5 is removably placed. The closure disc 5 is formed with a step-shaped periphery 5a which is complementary to a step-shaped periphery in the mold half 2, permitting the closure disc 5 to be inserted and removed from the mold half 2 only toward the inner chamber 9 when the mold is apart in its opened position. Before beginning a closing operation, the closure disc 5 is positioned in the complementary circular opening in the mold half 2.

The closure disc 3 is removably provided in a complementary circular opening in the mold half 1. The closure disc 3 is formed with a central aperture 4 and with a step-shaped periphery complementary to a step-shaped periphery 3a in the mold half 1, permitting the closure disc 3 to be inserted and removed from the mold half 1 in a direction away from the chamber 9, that is, even when the mold halves are in the closed position.

In operation, the mold halves 1 and 2 are closed by the rings 7, with the mold half 1 not having the closure disc 3 inserted therein, but with the closure disc 5 inserted in the mold half 2. After closing, the closing disc 5 is inserted for effecting the final closing of the mold, and pressed to permit the excess plastic material to flow out through the aperture 4.

A pair of cooperating frustoconical extension halves 6, one from each mold half 1 and 2, respectively, together form a cooperating complete frustoconical member in two parts, separated movably from each other along its diameter. Three pairs are preferably provided by which the mold halves 1 and 2 may be opened and closed by movement of the closure rings 7 thereabout, and maintained closed when desired.

In accordance with the present invention, an injection duct 8 is provided axially in at least one of the external extension halves 6 at the inner portion, communicating the exterior of the mold with the chamber 9. A hydraulic injection press 10 (in dashed lines in FIG. 1) injects plasticized material into the chamber 9 through this duct 8. Preferably the duct 8 is axially formed as a semi-cylindrical channel on each interior diameter surface 15' of the cooperating extension halves 6 to define a complete cylindrical duct 8 when the mold halves are clamped together.

Each frustoconical extension half 6 includes a frustoconical surface extending over 180° and a diameter surface 15' facing the corresponding other frustoconical extension half 6 of the mold half. At the base of the extension half 6 which has the injection duct 8 therein, a squared or cubed base portion 13 integrally extends laterally 13a (FIG. 3) and outwardly 13b (FIG. 1) therefrom. Accordingly, the frustoconical extension halves 6 in which the duct 8 is formed is reinforced and supported on a thickened base portion 13.

Another feature of the present invention is that the mold halves 1 and 2 are adapted for rigid connection to the injection press 10 at the thickened base portion 13 adjacent the duct 8. U-shaped recesses or grooves 12 are formed on the outer lateral side of the thickened base portion 13 of the mold, forming two parallel tracks on the cooperative pair of extensions 6 forming the duct 8. The mold is connected to the injection press 10 by sealing members on which the parallel grooves 12 are slidably disposed.

The base portion 13 includes an interior surface 13C within the chamber 9 which is square and flat and not curved, thereby breaking the circular, or more precisely the frustoconical shape of the chamber portion in each mold half, as well as substantially strengthening the mold and mold chamber and extension halves 6 having the injection duct 8 therein.

The chamber 9 is formed and defined by an interior frustoconical surface 14 in each of the mold halves, which surface 14 extends from adjacent the mold engaging surfaces 15 and 15' outwardly to a rear annular portion 16 of the mold half, which annular portion 16 defines the opening for the closure discs 3 or 5. The square and flat surface 13C is spaced from the axis 17 of the chamber 9 by a distance which interrupts the frustoconical surface 14, as well as a part of the rear annular portion 16. Accordingly, the chamber 9 does not exactly form two inverted frustoconical chamber portions, one in each mold half, nor is it perfectly circular in cross-section, and thereby a cast article in the chamber 9 is prevented from rotating about the axis 17.

When the mold is removed from the press after injection of the plastic material in its pasty condition into the cast within the mold, to open the mold it is only necessary to remove the rings 7 from the cooperating pairs of extensions 6.

Due to the substantial expansive pressure exerted within the mold due to the injection of the plastic material or the like, the friction between the ring 7 and the cooperating pairs of extensions 6 is increased. The removal of the rings 7 accordingly requires a powerful force. Therefore it is advantageous to provide peripheral U-shaped grooves on the rings 7 which can be engaged by connecting members of a mechanical extractor 11. The extractor, by pressing with a central portion on the frustoconical extensions 6 (FIG. 2), effects the extraction of all the rings, one after the other, respectively.

Once the rings are removed, the mold opens again in two halves, and with it the pairs of frustoconical extensions 6 also open and separate in two halves.

I claim:
1. A dental mold, comprising
two mold halves adapted to be removably clamped against each other and defining a hollow mold chamber therebetween,
a plurality of frustoconical extension halves on each mold half,
each frustoconical extension half cooperating with a corresponding frustoconical extension half on the other mold half together defining in abutting position a pair of frustoconical extension halves having a frustoconical surface,
a closing ring adapted to be positioned about each pair of corresponding frustoconical extension halves on said frustoconical surface thereof for releasably closing and retaining closed said mold halves, and
at least one of said frustoconical extension halves is formed at its center with an injection duct communicating with said hollow mold chamber for receiving a flow of plastic material to be injected into said hollow mold chamber.

2. The mold, as set forth in claim 1, wherein each of said frustoconical extension halves has a frustoconical surface portion extending across an arc substantially less than 360° and an abutting surface complementary to the corresponding abutting surface of the other of said frustoconical extension halves of said pair of frustoconical extension halves.

3. The mold, as set forth in claim 2, wherein said frustoconical surface portion extends 180° and said abutting surface is a diameter surface.

4. The mold, as set forth in claim 1, wherein said hollow chamber is substantially circular in cross-section and includes a limited surface oriented to interrupt the circular shape of said hollow mold chamber, thereby preventing rotation of a cast in said hollow mold chamber and simultaneously strengthening the chamber in the region of said limited surface.

5. The mold, as set forth in claim 4, further comprising
a thickened base potrion integral with said one of said frustoconical extension halves having said injection duct therein and including said limited surface, and
said base portion is formed with engaging recesses adapted for connection with an injection press device for injecting plastic material into said injecting duct.

6. The mold, as set forth in claim 4, wherein said hollow chamber is substantially frustoconical in shape in each mold half.

7. The mold, as set forth in claim 6, wherein said limited surface is substantially flat.

8. The mold, as set forth in claim 1, wherein
one of said two molds halves is formed with a rear annular wall having edges defining an opening communicating with said hollow mold chamber,
a closure disc complementary to said opening and having an aperture therein,
said edges formed complementary to the periphery of said closure disc and in a manner so as to permit insertion and removal of said closure disc in a direction outside of the mold halves, and
said closure disc for effecting the final closing of the mold by exerting on said closure disc a slight manual pressure and thereby causing any excess paste like plastic to leave said aperture.

9. The mold, as set forth in claim 8, wherein
said other of said two mold halves is formed with a second rear annular wall having second edges defining a second opening communicating with said hollow mold chamber,
a second closure disc formed complementary to said second opening, and
said second edges formed complementary to the periphery of said second closure disc and in a manner so as to permit insertion and removal of the latter from between said mold halves.

10. The mold, as set forth in claim 1, wherein said closing ring is formed with peripheral grooves adapted to be engaged by connecting members of a ring extractor which holds the ring and presses on the extension pairs to effect disengagement of the parts.

11. The mold, as set forth in claim 1, wherein
each frustoconical extension half has a 180° frustoconical surface portion and an inner diameter surface,
a semi-cylindrical channel formed axially in both of said inner diameter surfaces of said extension halves of one of said pair of frustoconical extension halves and cooperating together in the abutting clamped position of said inner diameter surfaces to constitute said injection duct as a cylindrical duct, said hollow mold chamber is substantially circular in cross-section, said mold halves having opposed rear annular walls forming openings theerin, two closure discs complementary to said openings, respectively, one of which includes edges formed so as to permit insertion from outside of said mold halves and having an aperture therein, and the other includes second edges formed so as to permit insertion from between said mold halves, a thickened base portion integral with each of the frusto-conical extension halves having said channels, respectively, and having a substantially square surface interrupting said circular cross-section, and said thickened base portions each having lateral recesses on rear portions thereof for engagement with an injection press device for injecting plastic material into said injection duct.

References Cited

UNITED STATES PATENTS

| | | | |
|---|---|---|---|
| 1,204,166 | 11/1916 | Levin | 249—54 |
| 1,792,987 | 2/1931 | Johnson. | |
| 2,328,285 | 8/1943 | MacDougall | 18—33 |

FOREIGN PATENTS

| | | |
|---|---|---|
| 799,528 | 8/1958 | Great Britain. |

J. SPENCER OVERHOLSER, Primary Examiner

J. E. ROETHEL, Assistant Examiner

U.S. Cl. X.R.

18—33, 34.1; 249—54